(12) United States Patent
Rogala

(10) Patent No.: US 6,612,375 B2
(45) Date of Patent: Sep. 2, 2003

(54) APPARATUS FOR COUNTERACTING VEHICLE PITCH VARIATION RESULTING FROM THE OPERATION OF AN ELECTRONIC DRAFT CONTROL SYSTEM

(75) Inventor: Jeffrey A. Rogala, Oconomowoc, WI (US)

(73) Assignee: HUSCO International, Inc., Waukesha, WI (US)

( * ) Notice: Subject to any disclaimer, the term of this patent is extended or adjusted under 35 U.S.C. 154(b) by 0 days.

(21) Appl. No.: 10/004,328

(22) Filed: Nov. 2, 2001

(65) Prior Publication Data

US 2003/0085042 A1 May 8, 2003

(51) Int. Cl.⁷ .............................................. A01B 63/112
(52) U.S. Cl. ........................................................ 172/8
(58) Field of Search ................. 701/50; 60/413, 60/414, 416; 172/2–11; 37/348

(56) References Cited

U.S. PATENT DOCUMENTS

| | | | | |
|---|---|---|---|---|
| 4,044,838 A | * | 8/1977 | Wooldridge | .................... 172/2 |
| 4,508,178 A | * | 4/1985 | Cowell et al. | ............... 172/239 |
| 4,834,461 A | * | 5/1989 | Fidler et al. | ................ 299/37.5 |
| 5,143,159 A | | 9/1992 | Young et al. | |
| 6,260,355 B1 | * | 7/2001 | Rausch et al. | ................. 60/413 |
| 6,470,251 B1 | * | 10/2002 | Enix | ............................ 701/50 |

FOREIGN PATENT DOCUMENTS

| | | |
|---|---|---|
| DE | 2149369 | 9/1971 |
| DE | 3446811 A1 | 7/1986 |
| DE | 4235264 A1 | 10/1992 |
| EP | 518226 A1 | 12/1992 |
| EP | 0773120 A2 | 5/1997 |
| WO | PCT/US 02/34405 | 2/2003 |

* cited by examiner

Primary Examiner—Robert E. Pezzuto
(74) Attorney, Agent, or Firm—Quarles & Brady LLP

(57) ABSTRACT

An apparatus and method for controlling variation in the pitch of an agricultural vehicle, where the apparatus includes a controller that controls a position of an implement attached to the agricultural vehicle, and a first valve that is coupled to, and receives a first control signal from, the controller. The apparatus further includes a suspension cylinder having a first chamber that is hydraulically coupled to the first valve. The first control signal provided from the controller is functionally related to a first additional control signal provided by the controller, and the first additional control signal is used to determine the position of the implement.

20 Claims, 2 Drawing Sheets

APPARATUS FOR COUNTERACTING VEHICLE PITCH VARIATION RESULTING FROM THE OPERATION OF AN ELECTRONIC DRAFT CONTROL SYSTEM

FIELD OF THE INVENTION

The present invention relates to agricultural work vehicles having hitches by which implements are attached to the vehicles. More particularly, the present invention relates to agricultural work vehicles having electronic draft control systems that allow for the automatic controlling of the positioning of the hitches and attached implements.

BACKGROUND OF THE INVENTION

Agricultural work vehicles such as tractors commonly tow implements such as plows that are attached to the vehicles by way of hitches. Often the positioning of an implement is controlled relative to the agricultural work vehicle to which the implement is attached by an electronic draft control (EDC) system of the agricultural work vehicle. Depending upon the type of agricultural work vehicle and/or implement being employed, an EDC system can control the positioning of an implement in a variety of ways.

For example, in the case where the agricultural work vehicle is a tractor, a tillage implement or plow can be attached to the tractor by way of a three-point hitch mounted at the rear of the tractor. A single quadrant lever, located in the tractor cab, is manually moved by the operator to generate position/draft commands which cause raising or lowering of the hitch. An EDC system including a microprocessor receives the position/draft commands and also receives feedback signals from draft sensors, which sense the draft on the hitch, and a position sensor, which senses the position of the hitch. The microprocessor responds to the position/draft commands and the feedback signals from the sensors by generating output signals for adjusting the position of the hitch. By varying the position of the hitch, the EDC system can vary the depth of the plow with respect to the ground, to account for varying resistance of the soil through which the plow is traveling.

Although such an implementation of an EDC system works well to control the positioning of the hitch and implement, the EDC system has an undesirable characteristic in that upward and downward pitching of the front portion of the tractor can occur when the EDC system attempts to produce changes in the positioning of the hitch and implement. The rear wheels of the tractor can act as a fulcrum of a lever formed by the body of the tractor. As a result, when the tractor is dynamically moving and towing the implement, or when the tractor is stationary but is raising or otherwise adjusting the positioning of the implement, variation in the amount of force between the implement and the rear of the tractor (applied by way of the hitch) can cause the front of the tractor to experience a corresponding change in downward or upward force. Further, particularly because of the tractor's pneumatic tires, the tractor acts as a spring-mass system. As a result, changes in force experienced by the tractor can result in an undesirable pitching and vibration of the tractor.

It would therefore be desirable if a system was developed for implementation on an agricultural work vehicle that counteracted the pitching and vibration of the agricultural work vehicle occurring as a result of the operation of an EDC system on the agricultural work vehicle. It further would be desirable if such a system could be implemented easily and without great expense.

SUMMARY OF THE INVENTION

The present inventors have discovered that it is possible to counteract the pitching and vibration of an agricultural work vehicle due to the operation of an EDC system by controlling elements of a suspension system of the agricultural work vehicle. In particular, the present inventors have discovered that it is possible to counteract the pitching and vibration of the vehicle by controlling in a proportional manner, based upon output signals from EDC system itself, damping valves that govern the flow of hydraulic fluid to and from one or more suspension cylinders of the agricultural work vehicle.

In particular, the present invention relates to an apparatus for controlling variation in the pitch of an agricultural vehicle. The apparatus includes a controller that controls a position of an implement attached to the agricultural vehicle, and a first valve that is coupled to, and receives a first control signal from, the controller. The apparatus further includes a suspension cylinder having a first chamber that is hydraulically coupled to the first valve. The first control signal provided from the controller is functionally related to a first additional control signal provided by the controller, and the first additional control signal is used to determine the position of the implement.

The present invention further relates to an apparatus for controlling variation in the pitch of a vehicle. The apparatus includes a control means for controlling a position of a device coupled to a rear of the vehicle, a first suspension device for controlling the suspension of a front of the vehicle, and a first damping device for controlling a damping of the first suspension device. The first damping device is coupled to the first suspension device and to the control means. The first damping device controls the damping based upon a first control signal that is proportionally related to an additional control signal provided by the control means for controlling the position of the device.

The present invention additionally relates to a method of controlling variation in the pitch of an agricultural vehicle. The method includes providing a controller capable of controlling the positioning of an implement attached to the agricultural vehicle, and providing a suspension system on the agricultural vehicle that includes a first suspension device and a first damping device. The method additionally includes generating a first position control signal to produce a change in the positioning of the implement, and generating a first suspension control signal to produce a change in operation of the first damping device. The first suspension control signal is functionally related to the first position control signal.

DETAILED DESCRIPTION OF THE INVENTION

Figure 1:
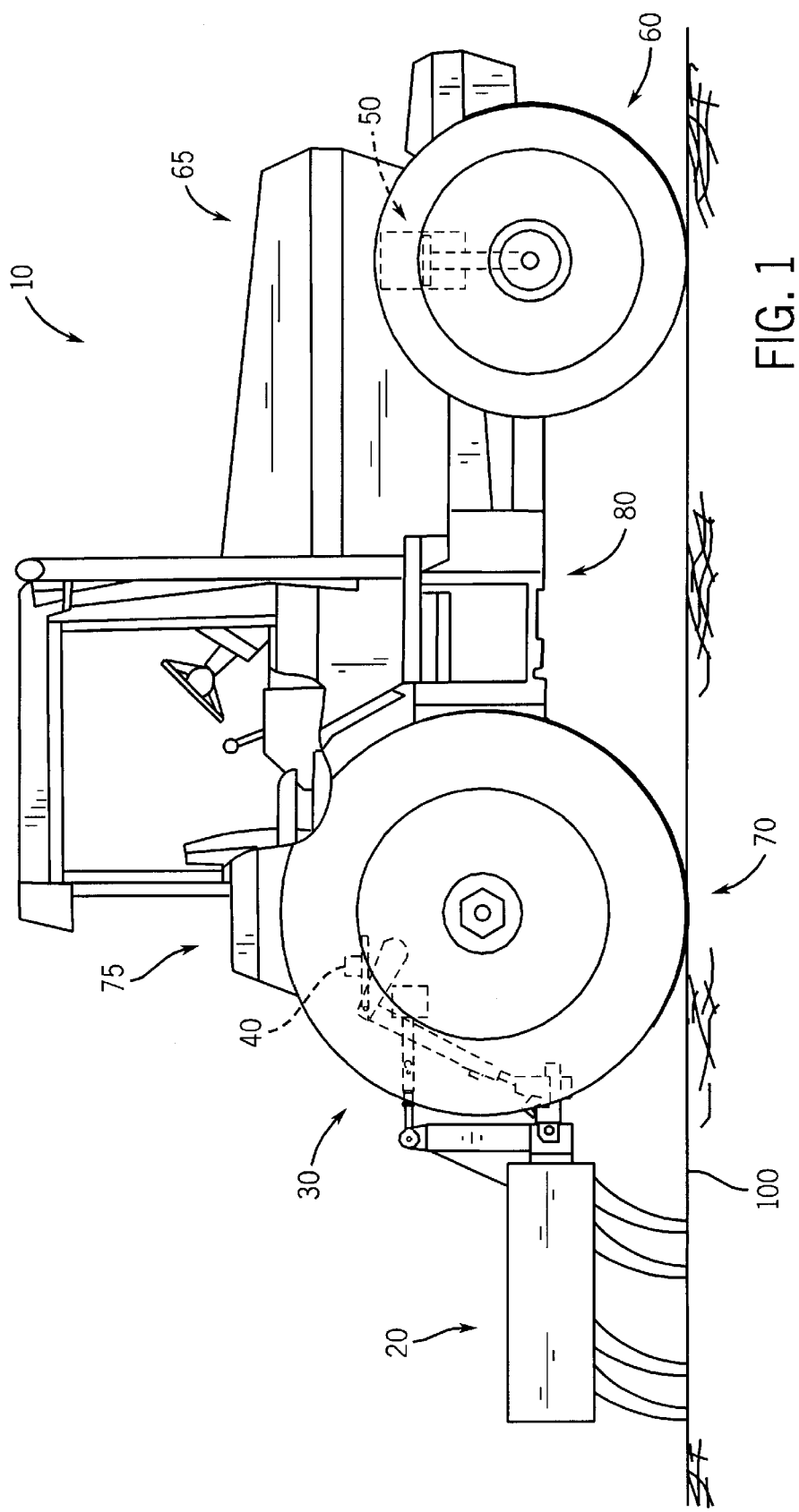
FIG. 1 is an elevation view of an exemplary implement being towed by an exemplary agricultural work vehicle on which is implemented a new system for counteracting vehicle pitch variation and vibration resulting from the operation of an electronic draft control (EDC) system on the vehicle.

Referring to FIG. 1, an exemplary agricultural work vehicle shown to be a tractor 10 tows an exemplary implement shown to be a plow 20. The plow 20 is attached to the tractor 10 by a hitching mechanism shown to be a three-point hitch 30. The position of the plow 20 with respect to the tractor 10 can be adjusted by adjusting the position of the hitch 30. In particular, the height level of the plow 20 with respect to the tractor 10 can be adjusted so that the plow cuts deeper into, or less deep into, the surface of the ground 100 over which the tractor 10 is traveling. Adjustment of the level of the plow 20 can occur while the tractor 10 is dynamically moving, and also can occur while the tractor is stationary. Although the tractor 10, plow 20 and three-point hitch 30 are respectively shown as the exemplary agricultural work vehicle, exemplary implement and hitching mechanism, the present invention is also applicable to other types of agricultural work vehicles (for example, combines), implements, or hitching mechanisms.

The tractor 10 further includes various components including front wheels 60 at a front 65 of the tractor, rear wheels 70 at a rear 75 of the tractor, and a chassis 80. The front and rear wheels 60, 70 are supported by front and rear axles respectively (not shown). As shown, the front wheels 60 support the chassis 80 by way of suspension cylinders 50. Typically, at least one suspension cylinder 50 is coupled to the front axle near each of the front wheels 60. Although FIG. 1 only shows in phantom a cylinder associated with the right front wheel of tractor 10, it is to be understood that another cylinder is associated with the left front wheel. Additionally, the tractor 10 includes an electronic draft control (EDC) system, shown to include an EDC controller 40. The EDC controller 40 typically includes a microprocessor. As is understood in the art, the EDC controller 40 receives command signals from an operator of the tractor 10 and further receives feedback signals from position and/or draft sensors (not shown) that are respectively indicative of the position/draft of the plow 20. Based upon these command and feedback signals, the EDC controller 40 generates control signals for controlling the positioning of the hitch 30 and thus the positioning of the plow 20.

During operation of the tractor 10 and plow 20, the plow 20 exerts varying levels of force (and torque) upon the rear 75 of the tractor 10 by way of the hitch 30. The amount and direction of the force exerted by the plow 20 depends upon several factors, including the weight, size and shape of the plow, as well as the resistance the plow encounters as it travels along or through the ground 100 while being towed by the tractor 10, or the resistance it encounters as it is pushed into or through the ground while the tractor is stationary, among other factors. The force in particular varies as the EDC controller 40 provides commands causing changes in the position/draft of the plow 20. As the forces exerted by the plow 20 upon the rear 75 of the tractor 10 by way of hitch 30 vary upward or downward, the chassis 80 of the tractor acts as a lever about a fulcrum formed by the rear wheels 70, and the front 65 of the tractor about the front wheels 60 experiences force downward or upward, respectively. As a result, the front 65 has a tendency to pitch upward and downward and vibrate in response to the operation of the EDC system, absent the new system for counteracting such pitching and vibration that is discussed below.

Figure 2:
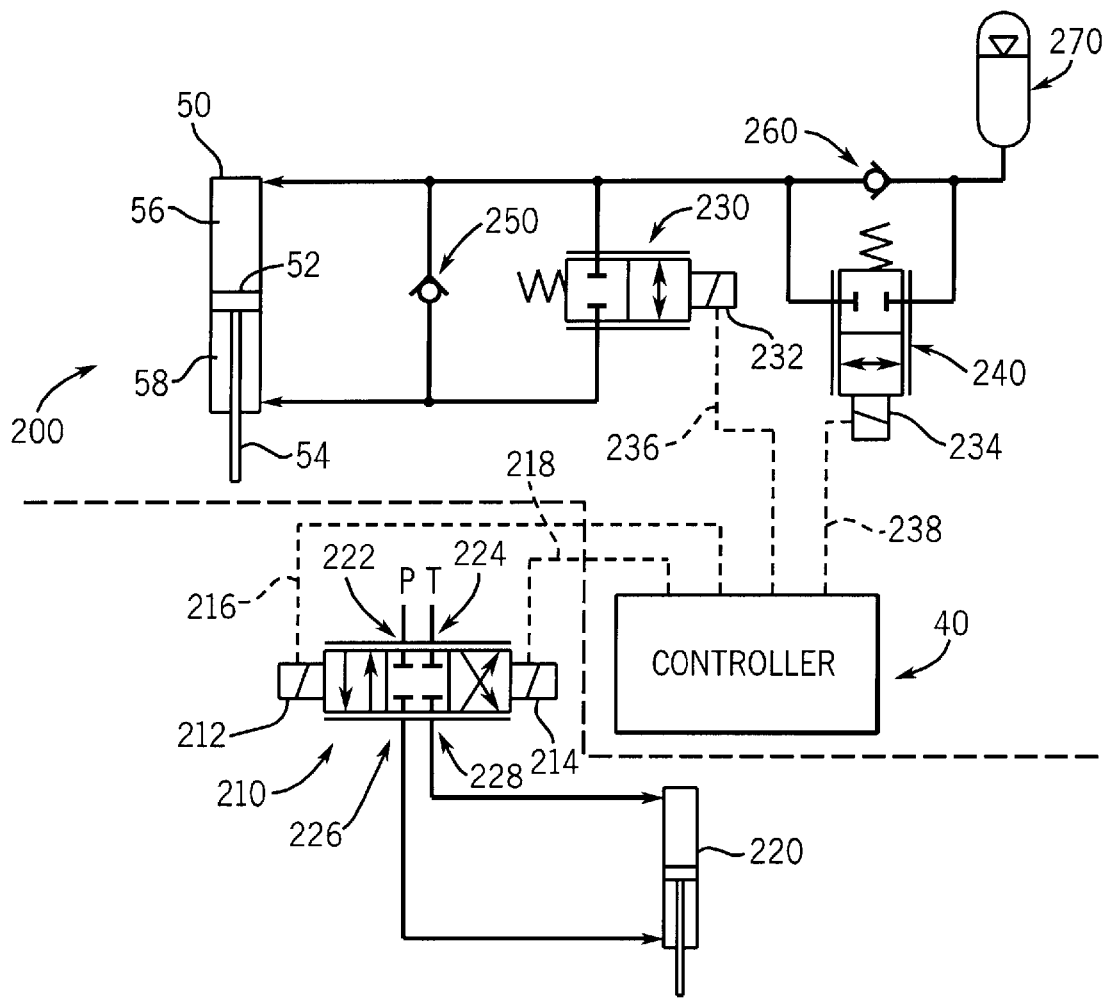
FIG. 2 is a schematic diagram of the new system for counteracting vehicle pitch variation and vibration of FIG. 1.

Turning to FIG. 2, additional exemplary elements of the EDC system are shown schematically. As shown, the EDC controller 40 controls the positioning of the hitch 30 and consequently the attached plow 20 by providing control signals to a hitch positioning valve 210. Specifically, a raise control signal 216 is provided to a raise solenoid 212 of the hitch positioning valve 210, and a lower control signal 218 is provided to a lower solenoid 214 of the hitch positioning valve. Two hydraulic ports 222, 224 of the hitch positioning valve 210 are coupled respectively to a pump or hydraulic fluid source (P) of the tractor 10 and to a tank of hydraulic fluid reservoir (T) of the tractor. Two opposing ports 226, 228 of the hitch positioning valve 210 are coupled to a hitch positioning cylinder 220 that physically determines the positioning of the hitch 30 and consequently the plow 20.

During operation, when the raise control signal 216 is provided from the EDC controller 40 to activate the raise solenoid 212, hydraulic fluid is pumped through the hitch positioning valve 210 to the hitch positioning cylinder 220 so that the hitch 30 and the plow 20 are raised. When the lower control signal 218 is provided from the EDC controller 40 to activate the lower solenoid 214, hydraulic fluid is pumped through the hitch positioning valve 210 to the hitch positioning cylinder 220 in the opposite direction so that the hitch 30 and the plow 20 are lowered. Thus, the EDC controller 40 by way of the raise and lower control signals 216, 218 can cause the raising and lowering of the hitch 30 and the plow 20. Although in the embodiment of FIG. 2, only a single hitch positioning cylinder 220 is shown, in alternate embodiments, different numbers or types of hitch positioning cylinders 220 can be employed. Also, while the embodiment shown allows hydraulically-powered raising and lowering of the hitch 20 and plow 30, in alternate embodiments, only the raising of the hitch 20 is hydraulically-powered (while the lowering of the hitch occurs due to the force of gravity).

In accordance with one embodiment of the present invention, FIG. 2 additionally shows a new system 200 for counteracting pitching and vibration of the tractor 10 that results from the operation of the EDC system. As shown, the new system 200 can be understood to encompass certain components of both the EDC system and a suspension system of the tractor 10, which includes the suspension cylinder 50. In particular, the new system 200 includes the EDC controller 40 of the EDC system, which provides the raise and lower control signals 216, 218 to determine the status of a hitch positioning valve 210 (as discussed above). Depending upon the embodiment, a different number of electrical control signals are generated by the EDC controller 40 for controlling varying numbers of devices for determining the position of the hitch/implement.

Further, the new system 200 includes elements of the suspension system of the tractor 10. In addition to the suspension cylinder 50, which includes a piston 52, a rod 54, a piston chamber 56 and a rod chamber 58, the new system 200 also includes a proportional rebound damping valve 230 and a first check valve 250 that are coupled in parallel with one another, and coupled between the piston and rod chambers. In the present embodiment, the rod 54 of the suspension cylinder 50 is coupled to the front axle (not shown) of the tractor 10, and the exterior of the cylinder itself is coupled to the chassis 80 of the tractor, in a manner such that downward force experienced by the front 65 of the tractor tends to cause a contraction of the rod into the cylinder, while upward force experienced by the front 65 of the tractor tends to cause an expansion of the rod out of the cylinder. In alternate embodiments, the exact configuration of the suspension cylinder 50 with respect to the remainder of the tractor 10 can take other forms. The first check valve 250 is oriented so that hydraulic fluid can only flow through that check valve in a direction from the piston chamber 56 to the rod chamber 58.

Additionally, a proportional compression damping valve 240 and a second check valve 260 are coupled in parallel with one another, and are coupled between the piston chamber 56 and an accumulator 270. The second check valve 260 is oriented so that hydraulic fluid can only flow out from the accumulator 270 via the second check valve, and not into the accumulator via the second check valve.

In the new system 200, the proportional rebound damping valve 230 and the proportional compression damping valve 240 are electrically coupled to and controlled by the EDC controller 40. In particular, the EDC controller 40 provides a first control signal 236 to a solenoid 232 of the proportional rebound damping valve 230 in order to control the opening and closing of that valve, and the EDC controller provides a second control signal 238 to a solenoid 234 of the proportional compression damping valve in order to control the opening and closing of that valve. In the present embodiment, each of the damping valves 230, 240 are proportional in operation; that is, the control signals 236, 238 provided from the EDC controller 40 can cause solenoids 232, 234 to operate to open or close the respective damping valves 230, 240 to a variety of degrees in addition to fully-closed and fully-opened positions. However, in alternate embodiments, the valves 230, 240 are valves that only open or close to a limited number of discrete positions.

The new system 200 operates to counteract the tendency of the tractor 10 to pitch or vibrate in response to the operation of the EDC system by generating control signals 236, 238 based upon the control signals 216, 218. The control signals 236, 238 control the opening and closing of damping valves 230, 240, respectively, which influence the speed with which the piston 52 and the rod 54 can move within the suspension cylinder 50. More specifically, by decreasing the amount of fluid flow that occurs within the damping valves 230, 240 by further closing the valves, the movement of the piston 52 and the rod 54 within the suspension cylinder 50 is increasingly damped. As a result, when additional upward or downward forces due to operation of the EDC system are experienced by the front 65 of the tractor 10 tending to cause an expansion or contraction of the rod 54 out of or into the suspension cylinder 50, the rapidity of response of the cylinder to these force changes will depend upon the status of the damping valves 230, 240.

The exact damping effect provided by each of the respective damping valves 230, 240 varies depending upon what type of force is currently being experienced by the tractor 10. When the front 65 of the tractor 10 experiences a downward force, this causes the piston 52 and rod 54 of the suspension cylinder 50 to tend to move upward within the suspension cylinder, and causes the piston chamber 56 to contract. The contraction of the piston chamber 56 in turn causes hydraulic fluid to move through the first check valve 250 and the proportional rebound damping valve 230 (assuming that the valve is in at least a partially-open position), and further causes hydraulic fluid to flow into the rod chamber 58.

However, because the rod chamber 58 has a smaller cross-sectional area than the piston chamber 56, due to the existence of the rod 54 in the rod chamber, not all of the hydraulic fluid displaced from the piston chamber 56 can be displaced into/toward the rod chamber. Rather, some of the hydraulic fluid must flow elsewhere. Because the second check valve 260 allows hydraulic fluid to flow only in a direction away from the accumulator 270, the remaining displaced hydraulic fluid from the piston chamber 56 must flow (in the absence of any other hydraulic fluid conductors, which could exist in alternate embodiments) toward the accumulator 270 by way of the proportional compression damping valve 240. Thus, the degree to which the damping valve 240 is opened or closed determines the rapidity with which the piston 52 and rod 54 can move upward within the cylinder 50.

Conversely, when the front 65 of the tractor 10 experiences an upward force, this causes the piston 52 and rod 54 to tend to move downward out of the suspension cylinder, and causes the rod chamber 58 to contract and the piston chamber 56 to expand. Although the hydraulic fluid forced from the rod chamber 58 can move toward the piston chamber 56 through the proportional rebound damping valve 230 (assuming that the valve is at least partially-closed in status), the piston chamber 56 tends to require that additional hydraulic fluid be provided to it because the piston chamber is expanding at a greater rate than the rod chamber 58 is contracting. In the present embodiment, the additional hydraulic fluid is provided from the accumulator 270. That is, the pressure within the accumulator 270 causes fluid to flow through the second check valve 260 and the proportional compression damping valve 240 (assuming that the valve is at least partially-closed in status) toward the piston chamber 56.

Because the first check valve 250 only allows hydraulic fluid to flow from the piston chamber 56 toward the rod chamber 58 and not vice-versa, the hydraulic fluid forced out of the rod chamber 58 can only flow towards the piston chamber 56 by way of the proportional rebound damping valve 230 (assuming that the valve is in at least a partially-closed position). Consequently, it is the status of the proportional rebound damping valve 230 that influences the rate at which hydraulic fluid can flow out of the rod chamber 58 and therefore influences the speed with which the rod 54 can expand out from the suspension cylinder 50 when the front 65 of the tractor experiences an upward force. To summarize, then, the status of the proportional compression damping valve 240 damps the pitching/vibration of the tractor 10 when the front 65 of the tractor is being forced downward, and the status of the proportional rebound damping valve 230 damps the pitching/vibration of the tractor 10 when the front of the tractor is being forced upward.

In order to appropriately control the damping valves 230, 240 so that the damping provided by those valves appropriately counteracts the pitching/vibration of the tractor 10 due to the operation of the EDC system, the EDC controller 40 calculates or otherwise generates the control signals 236, 238 as being functionally related to the control signals 216, 218. Specifically, the control signal 236 is calculated based upon the raise control signal 216. Basing the control signal 236 upon the raise control signal 216 is appropriate since, for example, when the raise control signal 216 causes the hitch 30 to raise, a downward force is experienced by the rear 75 of the tractor and an upward force is experienced by the front 65 of the tractor. To counteract or damp the upward force experienced by the front 65 of the tractor, the proportional rebound damping valve 230 is closed further to damp the expansion of the suspension cylinder 50.

Similarly, the control signal 238 is calculated based upon the lower control signal 218. Basing the control signal 238 upon the lower control signal 218 is appropriate since, for example, when the control signal 218 causes the hitch 30 to be lowered, an upward force can be experienced by the rear 75 of the tractor. As a result, a downward force is experienced by the front 65 of the tractor. To counteract or damp the downward force experienced by the front 65 of the tractor, the proportional compression damping valve 240 is closed further to damp the contraction of the suspension cylinder 50.

Although the exact functional relationships between control signals 216, 218, 236 and 238 can vary depending upon the embodiment, in one embodiment, the EDC controller 40 calculates each of the control signals 236, 238 as being directly or proportionally (or semi-proportionally) related to the control signals 216, 218, respectively. For example, the values of respective control signals 236, 238 at any given time are calculated to be equal to respective fractions (e.g., ⅗) of the concurrent values of control signals 216, 218, respectively. The appropriate factor(s) relating the various control signals will typically depend upon a variety of factors, some of which can depend upon the particular operational preferences of an operator. For example, the factor(s) can depend upon the weight or shape of the plow 20 (or other implement), the weight or shape of the tractor 10 (or other agricultural work vehicle), the hitch mechanism, the consistency of the ground 100, whether the tractor is moving (and at what speed) or is stationary, and preferences concerning the riding comfort of the tractor. Typically, the desired factor(s) can be determined by "tuning" the operation of the tractor.

A variety of alternate embodiments of the present invention to that discussed above with respect to FIG. 2 are also possible. For example, in one alternate embodiment, the EDC controller 40 only provides the signals 216 and 218, instead of providing all of the signals 216, 218, 236, and 238. In such an embodiment, a second, suspension controller can be employed that receives the signals 216, 218 and, based upon those signals, determines the signals 236, 238. Also, in other alternate embodiments a different hydraulic circuit can be employed having a different configuration of damping/check valves, accumulators, or other devices, or even a non-hydraulic (electromechanical or otherwise) mechanism can be employed to control the suspension of the tractor 10 and to damp the pitching and vibration occurring due to the operation of the EDC system.

In various alternate embodiments, cylinders that are either double-acting or single-acting can be utilized, or the different sides (e.g., piston and rod sides) of the cylinders can be isolated from one another or be coupled to separate accumulators. In additional alternate embodiments, load-leveling circuits are employed instead of damping control mechanisms. Further, while the present embodiment shows the new system 200 employed on an agricultural work vehicle, similar control systems to reduce pitching or vibration can also be employed on other vehicles that control the draft of a towed element by way of an EDC or similar control system.

Further, depending upon the embodiment, the number of control signals that are provided to the suspension control system can vary. For example, in one alternate embodiment, only a single control signal is provided to the one or more valves that control the suspension cylinders for the right and left sides of the vehicle. In another embodiment, multiple different control signals are provided to multiple different valves that are used to control separately the suspension cylinders for the different sides of the vehicle. In other embodiments, a system similar to the new system 200 can be employed in which control signals used to control devices other than implements coupled to the rear of the vehicle (e.g., implements at the front of the vehicle) are the basis for the control signals used to control the suspension of the vehicle.

While the foregoing specification illustrates and describes the preferred embodiments of this invention, it is to be understood that the invention is not limited to the precise construction herein disclosed. The invention can be embodied in other specific forms without departing from the spirit or essential attributes. Accordingly, reference should be made to the following claims, rather than to the foregoing specification, as indicating the scope of the invention.

What is claimed is:

1. An apparatus for controlling variation in the pitch of an agricultural vehicle, the apparatus comprising:
   a controller that controls a position of an implement attached to the agricultural vehicle;
   a first valve that is coupled to, and receives a first control signal from, the controller; and
   a vehicle suspension cylinder having a first chamber that is hydraulically coupled to the first valve;
   wherein the first control signal provided from the controller is functionally related to a first additional control signal provided by the controller, the first additional control signal being used to determine the position of the implement.

2. The apparatus of claim 1, wherein the suspension cylinder additionally has a second chamber, and wherein the first valve is coupled between the first and second chambers.

3. The apparatus of claim 2, further comprising a second valve that is coupled to, and receives a second control signal from, the controller; and
   wherein the second valve is coupled between an accumulator and the second chamber.

4. The apparatus of claim 3, further comprising a first check valve that is coupled between the first and second chambers, and a second check valve that is coupled between the accumulator and the second chamber, wherein hydraulic fluid can only flow through the first check valve in a first direction from the second chamber toward the first chamber, and hydraulic fluid can only flow through the second check valve in a second direction from the accumulator toward the second chamber.

5. The apparatus of claim 3, wherein the second control signal provided from the controller is functionally related to at least one of the first additional control signal provided by the controller and a second additional control signal.

6. The apparatus of claim 5, wherein the second control signal is functionally related to the second additional control signal, and the second additional control signal is also used to determine the position of the implement.

7. The apparatus of claim 6, wherein the second control signal is proportionally related to the second additional control signal, and the first control signal is proportionally related to the first additional control signal.

8. The apparatus of claim 3, wherein the first and second valves can attain a range of different positions in response to the first and second control signals.

9. The apparatus of claim 3, wherein the first and second valves can only attain certain numbers of discrete positions.

10. The apparatus of claim 3, wherein the first valve operates to damp extension of a rod out of the suspension cylinder corresponding to an upward force experienced by a front of the agricultural vehicle, and wherein the second valve operates to damp retraction of the rod into the suspension cylinder corresponding to a downward force experienced by the front of the agricultural vehicle.

11. The apparatus of claim 10, wherein the first control signal causes an increased damping by the first valve when the first additional control signal causes a raising of the implement, and the second control signal causes an increased damping by the second valve when the second additional control signal causes a lowering of the implement.

12. The apparatus of claim 3, wherein the controller either is an EDC controller or includes an EDC controller.

13. The apparatus of claim 1, further comprising a second suspension cylinder, wherein the first suspension cylinder influences the suspension of a right front wheel of the agricultural vehicle and the second suspension cylinder influences the suspension of a left front wheel of the agricultural vehicle.

14. The apparatus of claim 13, further comprising a third valve that is coupled to, and receives the first control signal from, the controller, wherein the second suspension cylinder is hydraulically coupled to the third valve.

15. An apparatus for controlling variation in the pitch of a vehicle, the apparatus comprising:
- a control means for controlling a position of a device coupled to a rear of the vehicle;
- a first suspension device for controlling the suspension of a front of the vehicle; and
- a first damping device for controlling a damping of the first suspension device, the first damping device being coupled to the first suspension device and to the control means;
- wherein the first damping device controls the damping based upon a first control signal that is proportionally related to an additional control signal provided by the control means for controlling the position of the device.

16. A method of controlling variation in the pitch of an agricultural vehicle, the method comprising:
- providing a controller capable of controlling the positioning of an implement attached to the agricultural vehicle;
- providing a vehicle suspension system on the agricultural vehicle that includes a first suspension device and a first damping device;
- generating a first position control signal to produce a change in the positioning of the implement; and
- generating a first suspension control signal to produce a change in operation of the first damping device,
- wherein the first suspension control signal is functionally related to the first position control signal.

17. The method of claim 16, wherein the first suspension control signal is proportionally related to the first position control signal.

18. The method of claim 16, further comprising:
- generating a second position control signal to produce an additional change in the positioning of the implement;
- generating a second suspension control signal to produce a change in operation of a second damping device, wherein the second suspension control signal is functionally related to the second position control signal.

19. The method of claim 18, wherein the first suspension control signal causes an increased damping by the first damping device when the first position control signal causes a raising of the implement, and the second suspension control signal causes an increased damping by the second damping device when the second position control signal causes a lowering of the implement.

20. The method of claim 16, wherein the first suspension device is a cylinder and the first damping device is a valve.

* * * * *